United States Patent
Ishigaki et al.

(10) Patent No.: US 8,800,956 B2
(45) Date of Patent: Aug. 12, 2014

(54) NON-SLIDING GATE VALVE

(71) Applicant: SMC Corporation, Chiyoda-ku (JP)

(72) Inventors: Tsuneo Ishigaki, Kitakatsushika-gun (JP); Hiromi Shimoda, Noda (JP); Hiroshi Ogawa, Okegawa (JP)

(73) Assignee: SMC Corporation, Chiyoda-ku (JP)

( * ) Notice: Subject to any disclaimer, the term of this patent is extended or adjusted under 35 U.S.C. 154(b) by 113 days.

(21) Appl. No.: 13/667,453

(22) Filed: Nov. 2, 2012

(65) Prior Publication Data
US 2013/0112906 A1    May 9, 2013

(30) Foreign Application Priority Data
Nov. 4, 2011 (JP) .................. 2011-242795

(51) Int. Cl.
*F16K 25/00* (2006.01)
(52) U.S. Cl.
USPC .................................. 251/58; 251/203
(58) Field of Classification Search
USPC .............. 251/203, 204, 326, 193, 58
See application file for complete search history.

(56) References Cited

U.S. PATENT DOCUMENTS 5,626,324 A * 5/1997 Nakamura et al. ............ 251/58
7,066,443 B2 * 6/2006 Ishigaki ........................ 251/195

FOREIGN PATENT DOCUMENTS

JP    11-351419    12/1999

* cited by examiner

*Primary Examiner* — Eric Keasel
*Assistant Examiner* — Kevin E Lynn
(74) *Attorney, Agent, or Firm* — Oblon, Spivak, McClelland, Maier & Neustadt, L.L.P.

(57) ABSTRACT

A parallel movement mechanism including guide grooves and guide rollers and a vertical movement mechanism including cam grooves and cam rollers are interposed between a drive rod and a valve shaft of an air cylinder, and a valve seal of a valve plate is moved vertically toward and away from a valve seat surface to open and close the opening by moving the valve shaft in parallel to the valve seat surface by the parallel movement mechanism and moving the same vertically with respect to the valve seat surface by the vertical movement mechanism.

13 Claims, 17 Drawing Sheets

NON-SLIDING GATE VALVE

BACKGROUND OF THE INVENTION

1. Field of the Invention

The present invention relates to a gate valve mounted on a vacuum chamber in a semiconductor processing apparatus and used for opening and closing an opening communicating with the vacuum chamber and, more specifically to a non-sliding gate valve configured to be capable of opening and closing the opening without sliding.

2. Description of the Related Art

In a semiconductor processing apparatus, a gate valve is used for opening and closing an opening communicating with a vacuum chamber. The gate valve generally includes a valve plate configured to open and close the opening, a valve shaft coupled to the valve plate, and an air cylinder coupled to the valve shaft, and is configured to open and close the opening by bringing a valve seal of the valve plate toward and away from a valve seat surface around the opening by operating the valve shaft with the air cylinder.

Examples of the gate valves include a system for opening and closing a valve plate by causing the valve shaft to tilt about a point as a pivot point and a system for opening and closing the valve plate by moving the valve shaft and the valve plate vertically with respect to the valve seat surface.

From these systems, in the gate valve of the system of opening and closing the valve plate by tilting the valve shaft, since the valve seal receives a predetermined pressing force after coming into contact with the valve seat surface, if the tilting movement of the valve shaft is continued, the valve plate is displaced with respect to the valve seat surface in the direction along the seat surface. Consequently, friction may be generated between the valve seal and the valve seat surface, or the valve seal may rotate within a mounting groove, whereby abrasion powder is generated which may be detrimental to cleaning of the valve.

In contrast, in the gate valve of the system for opening and closing the valve plate by moving the valve shaft and the valve plate vertically with respect to the valve seat surface, since no friction is generated between the valve seal and the valve seat surface, there is no fear of generation of the abrasion powder. Patent Document, Japanese Unexamined Patent Application Publication No. 11-351419, described below discloses a non-sliding gate valve in which no friction is generated between the valve seal and the valve seat surface. This gate valve includes a plurality of links, cam followers and guide grooves interposed between a drive rod (propelling shaft) of the air cylinder and the valve shaft (valve rod), and is configured to close the opening by moving the valve plate from an open position to a position facing the opening in parallel with respect to the valve seat surface around the opening, and then moving the valve plate vertically with respect to the valve seat surface.

SUMMARY OF INVENTION

However, the gate valve disclosed in Patent Document 1 has disadvantages in that the number of components is increased and the structure is complicated, so that the operation is complicated since a mechanism for moving the valve plate vertically with respect to the valve seat surface is configured by combining a plurality of the links, cam followers, and guide grooves.

It is an object of the present invention to provide a non-sliding gate valve which is capable of opening and closing an opening by moving a valve shaft and a valve plate vertically with respect to a valve seat surface only by interposing a simple mechanism using a cam between a drive rod of an air cylinder and the valve shaft.

In order to achieve the above-described object, according to the present invention, there is provided a gate valve including: a valve plate stored in a valve box having an opening; a valve seal mounted on the valve plate; a valve shaft coupled to the valve plate; an air cylinder having a drive rod coupled to the valve shaft: the valve plate being configured to move from a fully-open position where the valve plate does not oppose the opening through an opposed position where the valve plate opposes the opening to a closed position where the valve plate closes the opening by pressing the valve seal to a valve seat surface around the opening by moving the valve shaft by the air cylinder.

The gate valve includes a coupling mechanism configured to couple the drive rod and the valve shaft so as to be displaceable with respect to each other; a parallel movement mechanism configured to move the valve plate and the valve shaft from the fully-open position to the opposed position in parallel to the valve seat surface; and a vertical movement mechanism configured to move the valve plate and the valve shaft from the opposed position to the closed position vertically with respect to the valve seat surface, the coupling mechanism includes: a rod arm fixed to the drive rod; a lever member fixed to the valve shaft; and a compression spring interposed between the lever member and the rod arm, the parallel movement mechanism includes: a pair of left and right cam frames fixed to the rod arm so as to face a left side surface and a right side surface of the lever member respectively; guide grooves formed so as to be parallel to the valve seat surface on the cam frames respectively; and guide rollers mounted on a pair of left and right roller frames fixed to a bonnet on which the valve box is mounted and configured to fit the guide grooves, the vertical movement mechanism includes: cam grooves formed respectively on the pair of cam frames in the direction inclined with respect to the valve seat surface; and cam rollers mounted respectively on the left side surface and the right side surface of the lever member and configured to fit the cam grooves.

In the present invention, preferably, one of the guide groove and the two of the cam grooves are formed on each of the pair of cam frames, and the two cam rollers are mounted on the left side surface and the right side surface of the lever member respectively.

In this case, it is preferable that the guide grooves are formed so as to be parallel to an axial line of the valve shaft, and the two cam grooves and the two cam rollers fitting to the cam grooves are disposed in two steps in the direction of axial line of the valve shaft.

In the present invention, the guide grooves may be formed on one half side of the cam frames in the width direction, and the cam grooves may be formed on the other half side of the cam frame in the width direction, or the guide grooves may be formed on outer surfaces of the cam frames opposing the roller frame, and the cam grooves may be formed on inner surfaces of the cam frames opposing the lever member.

In the present invention, preferably, the guide grooves are grooves opened on one end of each thereof, a plurality of the guide rollers are mounted on the left and right roller frames respectively, at least one guide roller from among the plurality of guide rollers is fitted to the guide grooves when the valve plate is at the fully-open position, and all the guide rollers fit to the guide grooves when the valve plate is at the opposed position and the closed position.

In one embodiment of the present invention, the cam grooves disposed in two steps include a first cam groove arranged at a position closer to the valve plate and a second cam groove arranged at a position farther from the valve plate, and angles of inclination of the first cam groove and the second cam groove with respect to the axial line of the valve shaft is equal to each other.

In another embodiment of the present invention, the cam grooves disposed in two steps include the first cam groove arranged at a position closer to the valve plate and the second cam groove arranged at a position farther from the valve plate, the second cam groove includes a first groove portion and a second groove portion whose angles of inclination with respect to the axial line of the valve shaft are different from each other, the second groove portion is arranged at a position farther from the valve plate than the first groove portion, and the angle of inclination of the second groove portion is larger than the angle of inclination of the first cam groove with respect to the axial line of the valve shaft.

Also, in the present invention, one each of the air cylinders are provided on the left side and the right side of the valve shaft in a state of being fixed to the bonnet, the rod arm is mounted on the two drive rods extending from the two air cylinders, and cylinder housings serve as the roller frames.

In this manner, according to the gate valve of the present invention, since the valve plate is moved vertically with respect to the valve seat surface and moves the valve seal toward and away from the valve seat surface, generation of abrasion powder is reliably prevented without causing friction between the valve seal and the valve seat surface or without allowing the valve seal to rotate within the mounting groove.

In addition, since the opening and closing operation of the valve plate is realized by a direct advance movement of the air cylinder by a simple mechanism using the cam interposed between the drive rod and the valve shaft, the structure of the operating mechanism is simple, less number of components is needed, and a large sealing force is provided.

DESCRIPTION OF THE EMBODIMENTS

Figure 1:
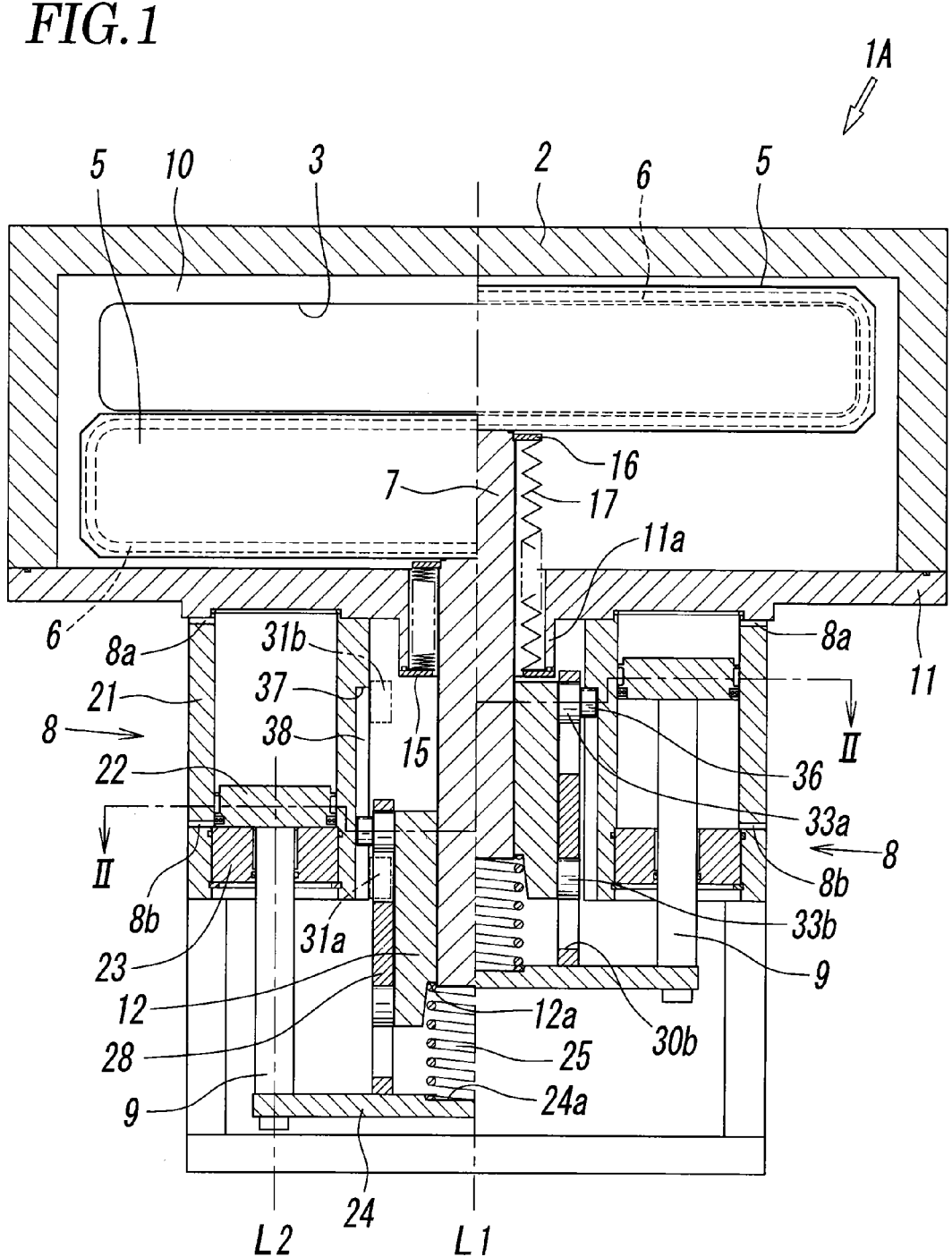
FIG. 1 is a cross-sectional view taken along the line I-I in FIG. 2 illustrating a first embodiment of a gate valve according to the present invention, and a left half indicates a state in which a valve plate is at a valve-open position, and a right half indicates a state in which the valve plate is at an opposed position.
Figure 2:
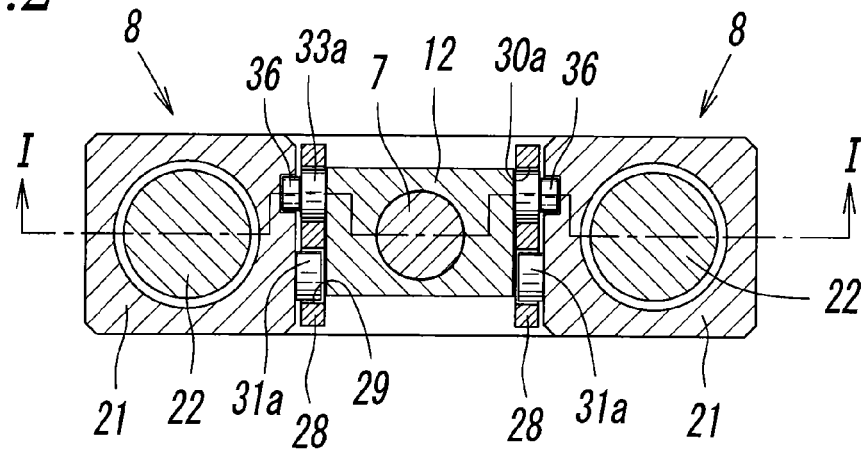
FIG. 2 is a cross-sectional view taken along the line II-II in FIG. 1.

FIG. 1 to FIG. 8 shows a first embodiment of a non-sliding gate valve according to the present invention. The gate valve 1A is mounted on a vacuum chamber in a semiconductor processing apparatus configured to open and close an opening communicating with the vacuum chamber, including a valve box 2 having the opening 3, a valve plate 5 housed in the valve box 2, a valve seal 6 mounted on the valve plate 5, a valve shaft 7 coupled to the valve plate 5, and an air cylinder 8 having a drive rod 9 coupled to the valve shaft 7, wherein the valve plate 5 takes a fully-opened position where the opening 3 is fully opened at a position not opposing the opening 3 (see the left half of FIG. 1 and FIG. 4), an opposing position where the valve plate 5 opposes the opening 3 but is not closed (see the right half of FIG. 1 and FIG. 5), and a closed position where the valve seal 6 is pressed against a valve seat surface 10 around the opening 3 and the opening 3 is closed (see FIG. 6 and FIG. 7) by moving the valve shaft 7 by the air cylinder 8.

Figure 4:
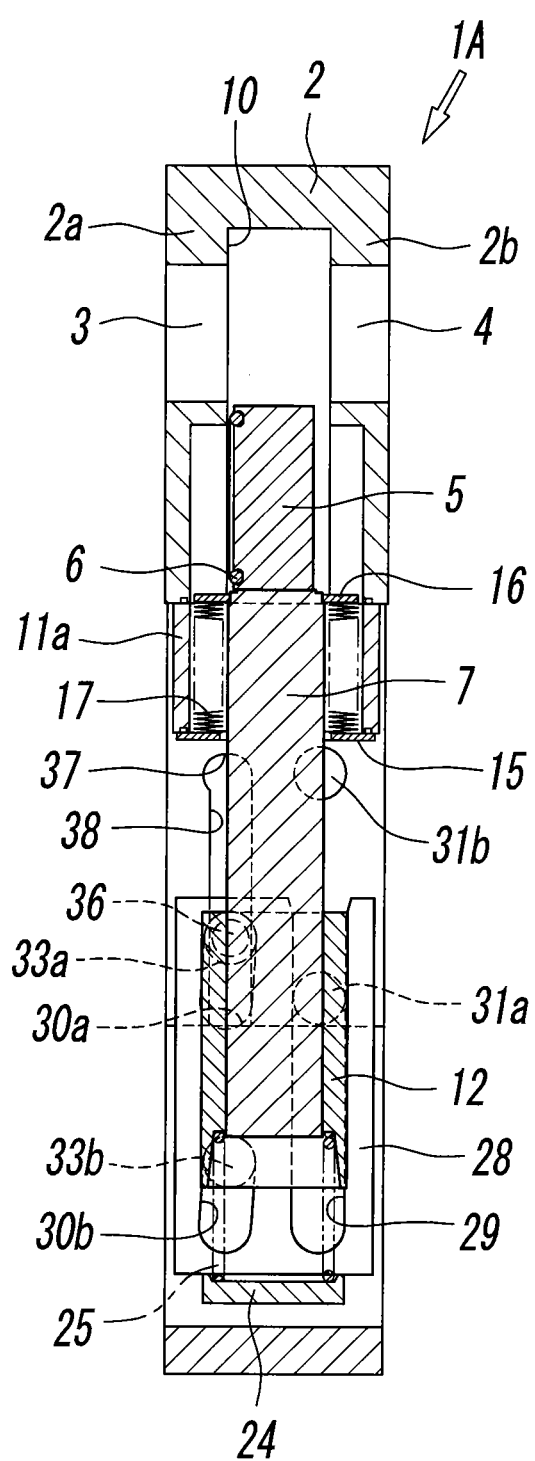
FIG. 4 is a vertical cross-sectional view illustrating a left half side of FIG. 1.

The valve box 2 has a square box shape as is apparent from FIG. 1 and FIG. 4, is formed with the opening 3 and an opening 4 having a laterally elongated rectangular shape on front and rear walls 2a, 2b opposed to each other, and the valve plate 5 having a laterally elongated rectangular shape configured to open and close the opening 3 of the front wall 2a is housed in the interior of the valve box 2.

An inner surface of the front wall 2a is formed with the valve seat surface 10 formed of a flat surface having a rectangular shape or an ellipsoidal shape so as to surround the opening 3, and the valve seal 6 having a rectangular shape or an ellipsoidal shape configured to come into abutment with the valve seat surface 10 and close the opening 3 is mounted on a front surface of the valve plate 5.

An upper end of the column-shaped valve shaft 7 is coupled to a center portion of the valve plate 5, and a lower end portion of the valve shaft 7 penetrates through a cylindrical portion 11a at a center of a bonnet 11 hermetically fixed to a bottom portion of the valve box 2 and extends downward from the valve box 2, and a lever member 12 having a rectangular cross section is fixed to the lower end. A lower end portion of the lever member 12 projects slightly downward from the lower end portion of the valve shaft 7. An axial line L1 of the valve shaft 7 is parallel to the valve seat surface 10.

An end and the other end of bellows 17 expanded and contracted by upward and downward movements of the valve shaft 7 are coupled to an annular mounting member 15 mounted on an end of the cylindrical portion 11a of the bonnet 11 so as to protrude toward an inner periphery of the cylindrical portion 11a and an annular mounting member 16 mounted on an outer periphery of the valve shaft 7 at a position vicinity of the valve plate 5 in an air-tight manner and the interior of the valve box 2 is completely blocked from the outside by the bellows 17.

Two of the air cylinders 8 are mounted at positions on a lower surface of the bonnet 11 opposing each other with the valve shaft 7 interposed therebetween in a posture in which an axial line L2 of the drive rods 9 is oriented to be parallel to the axial line L1 of the valve shaft 7. The air cylinders 8 each include a cylinder housing 21 having a rectangular outer peripheral surface, a piston 22 housed in the cylinder housing 21 so as to be slidable in the direction of the axial line L2, and the drive rod 9 an upper end of which is coupled to the piston 22, and an upper end of the cylinder housing 21 is fixed to the bonnet 11, and the drive rod 9 extends downward from an end plate 23 mounted on a lower end of the cylinder housing 21.

One end and the other end of a plate-shaped rod arm 24 are fixed to lower ends of the two drive rods 9, 9 extending from the two air cylinders 8. The rod arm 24 extends horizontally to a position lower than the lower ends of the valve shaft 7 and the lever member 12, and a compression spring 25 is interposed between a depressed spring seat 24a formed on an upper surface of a center of the rod arm 24 and a depressed spring seat 12a formed on a center of a lower surface of the lever member 12.

Figure 3:
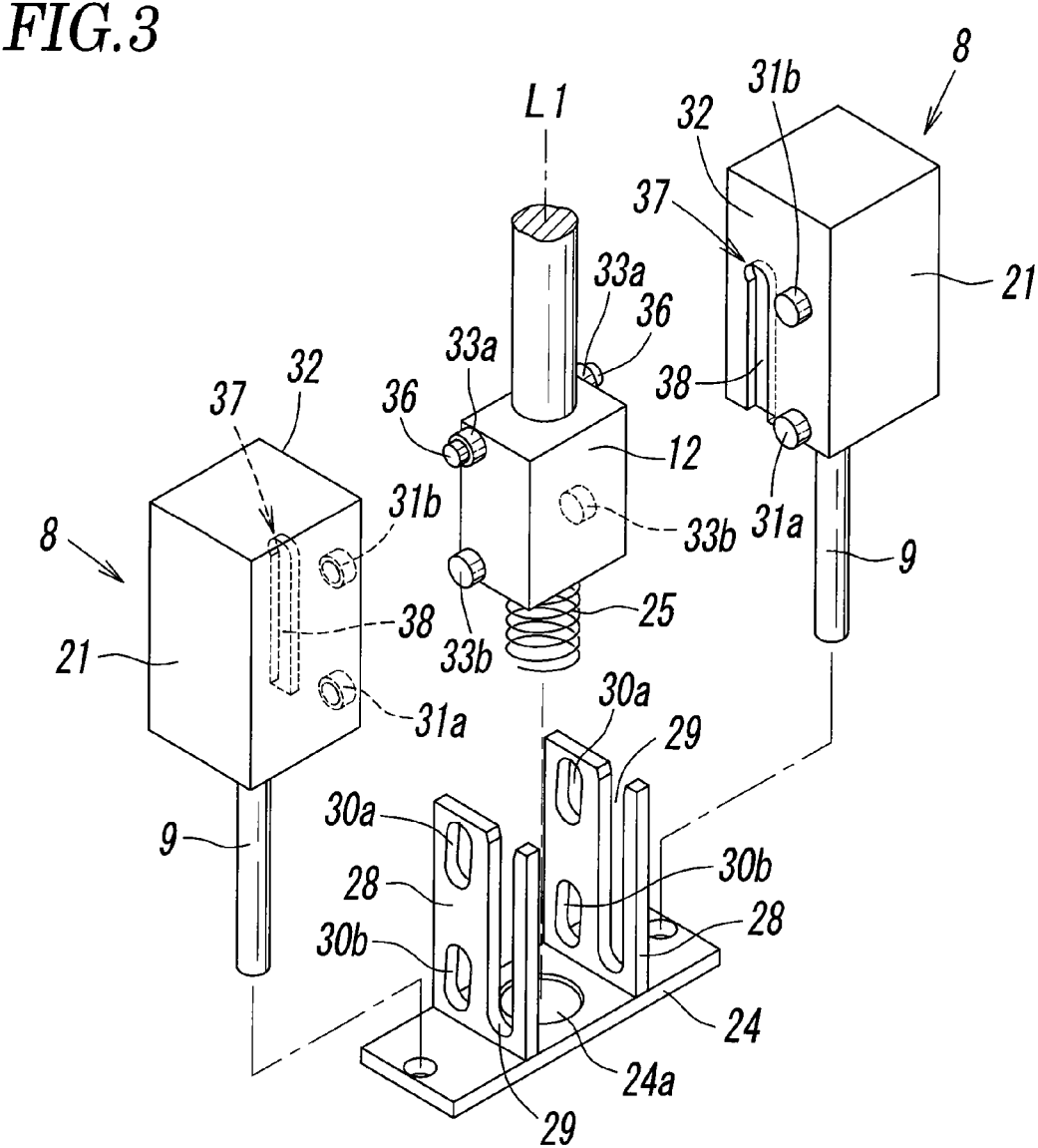
FIG. 3 is a perspective view illustrating a principal portion of FIG. 1 in an exploded manner.

Referring also to FIG. 3, a pair of left and right cam frames 28, 28 are fixed in parallel to the axial line L1 of the valve shaft 7 to an upper surface of the rod arm 24 in an arrangement opposing respectively to a left side surface and a right side surface of the lever member 12, and one guide groove 29 and two cam grooves 30a, 30b are formed on each of the cam frames 28 so as to penetrate through the cam frames 28.

The guide groove 29 is formed on one half side of the cam frame 28 in the width direction in parallel with the axial line L1 of the valve shaft 7, and an upper end of the guide groove 29 is opened to the outside. The groove width of the guide groove 29 is constant over the entire length. The guide groove 29 may be formed on an outer surface of the cam frame 28 facing the air cylinder 8 so as not to penetrate therethrough.

In contrast, the cam grooves 30a, 30b are linear grooves having a constant groove width inclined with respect to the axial line L1 of the valve shaft 7, and are inclined toward the valve seat surface 10 as it goes downward. Then, two of the cam grooves 30a, 30b are disposed on the other half of the cam frame 28 in the width direction at two steps in the axial direction L1 of the valve shaft 7 in a posture inclined the same angle in the same direction and hence in parallel to each other.

On each of the cylinder housings 21 of the two air cylinders 8, 8 on an inner surface facing the valve shaft 7, two guide rollers 31a, 31b having the same size fitting to the guide groove 29 are mounted. The two guide rollers 31a, 31b are arranged at positions apart from each other in the vertical direction, and when the valve plate 5 and the valve shaft 7 are at the fully-open position, only the lower first guide roller 31a fits into the guide groove 29 of the cam frame 28, and when the valve plate 5 and the valve shaft 7 move toward the opposed position, the second guide roller 31b also fits into the guide groove 29 at a position near the opposed position, so that the axial line L1 of the valve shaft 7 is maintained in parallel with the valve seat surface 10 by the guide rollers 31a, 31b, and the valve shaft 7 and the valve plate 5 are moved in parallel with respect to the valve seat surface 10 from the fully-open position to the opposed position.

Therefore, the cam frames 28, the guide grooves 29, and the guide rollers 31a, 31b constitute a parallel movement mechanism configured to move the valve shaft 7 and the valve plate 5 in parallel to the valve seat surface 10 from the fully-open position to the opposed position.

Parts of the cylinder housings 21 function also as roller frames for mounting the guide rollers 31a, 31b. Therefore, in the description given below, portions on which the guide rollers 31a, 31b of the cylinder housings 21 are mounted may be referred to as "roller frames 32". However, the roller frames 32 may be formed separately from the cylinder housing 21.

On the left side surface and the right side surface of the lever member 12, two cam rollers 33a, 33b fitting to the two cam grooves 30a, 30b of the cam frame 28 are mounted respectively. The two cam rollers 33a, 33b are arranged at positions apart from each other in the vertical direction, are fitted to the two cam grooves 30a, 30b individually and are pressed to upper ends of the respective cam grooves 30a, 30b by a spring force of the compression spring 25 at the fully-open position and the opposed position.

Then, when the cam frames 28 move upward in a state in which the valve shaft 7 is stopped at the opposed position by a stopping mechanism described later, the cam rollers 33a, 33b are pushed by the inclined cam grooves 30a, 30b by the upward movement of the cam grooves 30a, 30b and are moved vertically with respect to the valve seat surface 10 in the direction toward the valve seat surface 10 and, in association therewith, the valve shaft 7 and the valve plate 5 are moved in the same direction, so that the valve seal 6 of the valve plate 5 is pressed against the valve seat surface 10 whereby the valve plate 5 takes the closed position.

Therefore, the cam grooves 30a, 30b and the cam rollers 33a, 33b constitute a vertical movement mechanism configured to move the valve shaft 7 and the valve plate 5 vertically with respect to the valve seat surface 10.

The stopping mechanism includes stop rollers 36 mounted on the lever member 12, and abutting portions 37 formed on the roller frames 32.

The stop rollers 36 are mounted coaxially on the outsides of first cam rollers 33a provided on upper portions and are formed to be smaller than the first cam rollers 33a. However, the stop rollers 36 may have the same diameter as the first cam rollers 33a.

Figure 8:
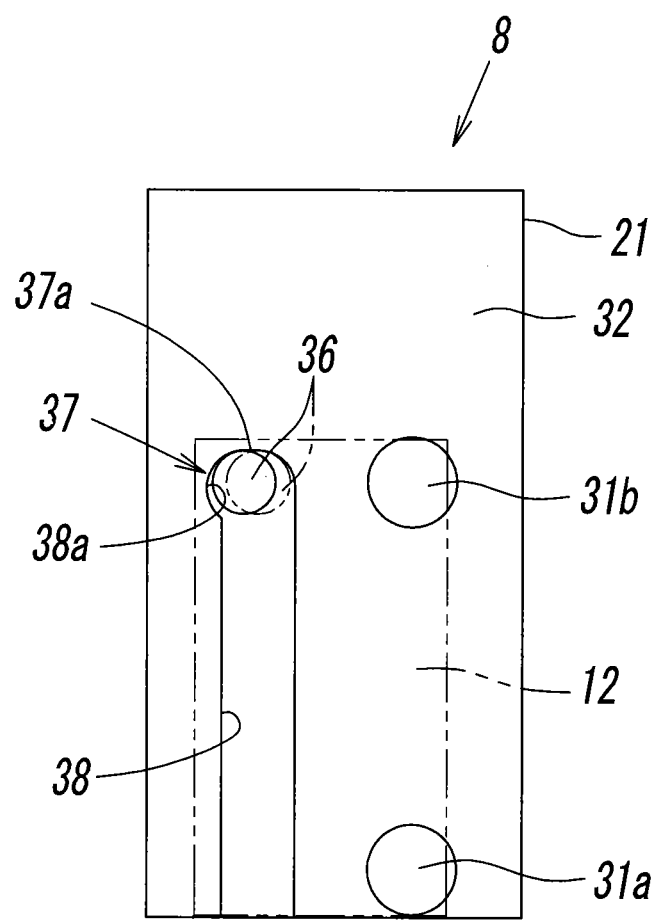
FIG. 8 is a side view of a principal portion illustrating a positional relationship between a stop roller and an abutting portion when the valve plate is in the closed position.

The abutting portions 37 are formed on upper end portions of depression grooves 38 formed on inner side surfaces of the roller frames 32 as is understood from FIG. 8, and the stop rollers 36 are fitted into the depression grooves 38. The depression grooves 38 extend in parallel to the axial line L1 of the valve shaft 7 and, when the valve shaft 7 is moved from the fully-open position to the opposed position, the stop rollers 36 come into abutment with the abutting portions 37 so that the valve shaft 7 stops at that position.

The abutting portions 37 are each formed with a flat surface 37a extending vertically with respect to the valve seat surface 10 so that when the valve shaft 7 is moved from the opposed position to the closed position after the stop roller 36 has abutted against the abutting portion 37, the stop roller 36 moves along the flat surface 37a in the same direction as the valve shaft 7 with respect to the abutting portion 37. Therefore, a lateral groove portion 38a for receiving the moved stop roller 36 is formed on the upper end portion of the depression groove 38.

Here, the compression spring 25 interposed between the rod arm 24 and the lever member 12 includes a spring force which is enough to support the weights of the valve plate 5, the valve shaft 7, and the lever member 12 and, by pressing the cam rollers 33a, 33b against the upper ends of the cam grooves 30a, 30b by this spring force, the valve shaft 7 and the rod arm 24 are integrated when the valve plate 5 moves from the fully-open position to the opposed position, and the compression spring 25 is compressed when the valve plate 5 is moved from the opposed position to the closed position and a relative movement between the valve shaft 7 and the rod arm 24 is allowed. Therefore, the compression spring 25 constitutes a coupling mechanism for coupling the lever member 12 and the rod arm 24 so as to allow relative displacement between the valve shaft 7 and the drive rod 9.

Subsequently, the operation of the gate valve 1A having the configuration as described above will be described. The left half of FIG. 1 and FIG. 4 illustrate a state in which the valve plate 5 takes the fully-opened position moved away from the opening 3 and retracted to a lower end portion of the valve box 2. At this time, the drive rod 9 of the air cylinder 8 expands completely downward, the valve shaft 7 and the valve plate 5 take the lowermost position, the respective cam rollers 33a, 33b are pressed against the upper ends of the cam grooves 30a, 30b by the spring force of the compression spring 25, whereby the drive rod 9 and the valve shaft 7 are in the state of being integrated via the rod arm 24, the cam frame 28, and the lever member 12, the lower first guide roller 31a from the two guide rollers 31a, 31b fits the guide groove 29, and the stop roller 36 moves away from the abutting portion 37 and is located at a lower portion of the depression groove 38.

In the description given below, the drive rod 9, the rod arm 24, and the cam frame 28 which are in fixed relation with each other are referred to as a "rod-side assembly", and the lever member 12, valve shaft 7 and the valve plate 5 which are also in the fixed relationship are referred to as a "shaft-side assembly".

Figure 5:
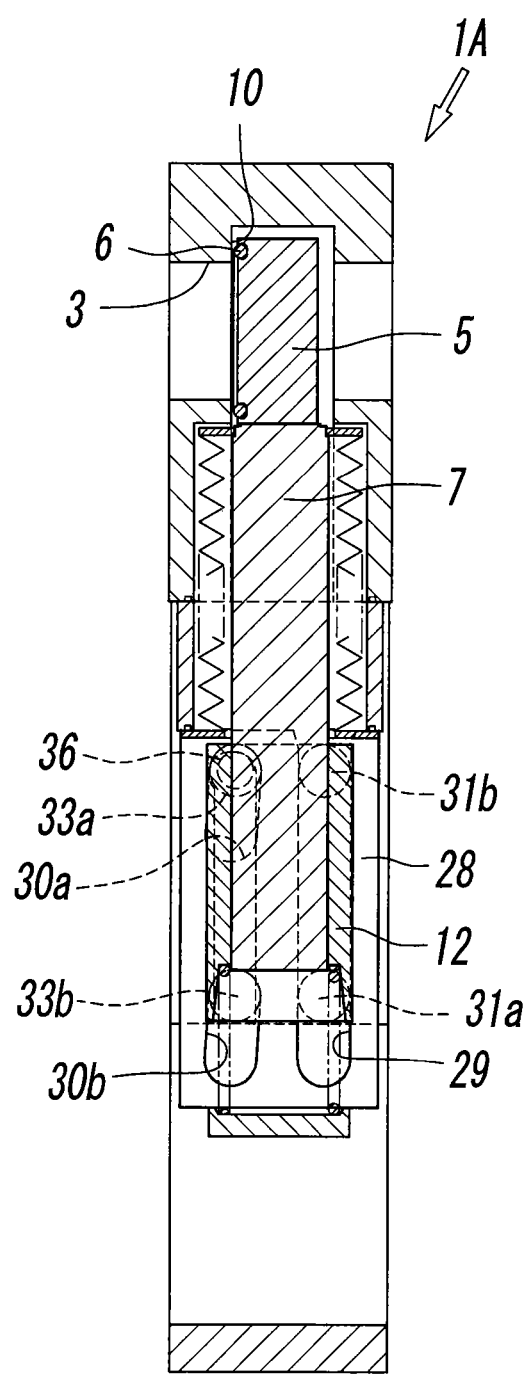
FIG. 5 is a vertical cross-sectional view illustrating a right half side of FIG. 1.

When an upper port 8a of the air cylinder 8 is opened to the outside from the state of the fully-opened position and compressed air is supplied to a lower port 8b to move the drive rod 9 upward, the rod-side assembly and the shaft-side assembly moved upward integrally to each other and, as illustrated in the right half of FIG. 1 and FIG. 5, the valve plate 5 faces the opening 3, but the valve seal 6 reaches the opposed position apart from the valve seat surface 10.

At this time, in an early stage of upward movement of the rod-side assembly and the shaft-side assembly, as illustrated in FIG. 4, the cam frame 28 is guided by the lower first guide roller 31a fitted to the guide groove 29, whereby parallel movement of the rod-side assembly and the shaft-side assembly is performed in a state in which the axial line L1 of the valve shaft 7 is maintained to be parallel to the valve seat surface 10. Then, when the rod-side assembly and the shaft-side assembly get closer to the opposed position, the second guide roller 31b fit the guide groove 29 as illustrated in FIG. 5, and the parallel movement of the rod-side assembly and the shaft-side assembly are guided by the two guide rollers 31a, 31b.

Figure 6:
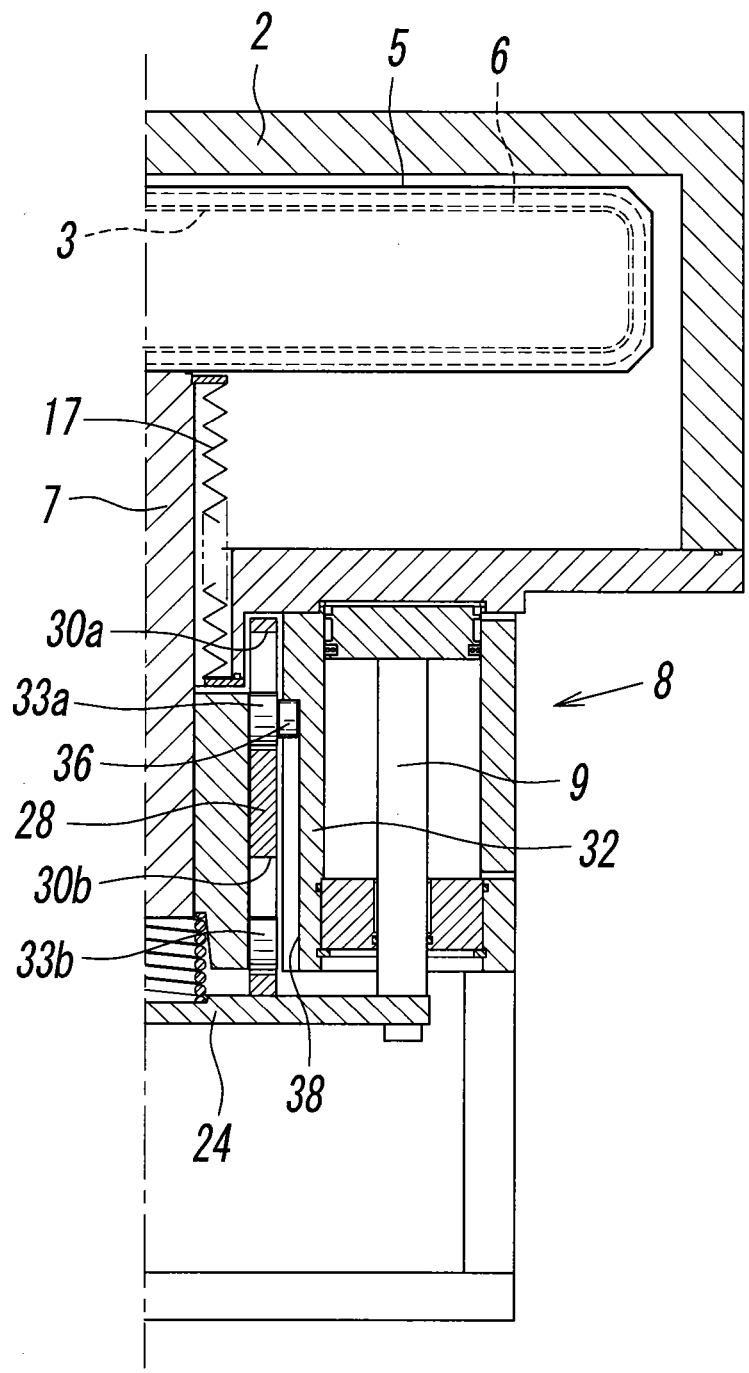
FIG. 6 is a cross-sectional view similar to the right half of FIG. 1 illustrating in which the valve plate is in a closed position.
Figure 7:
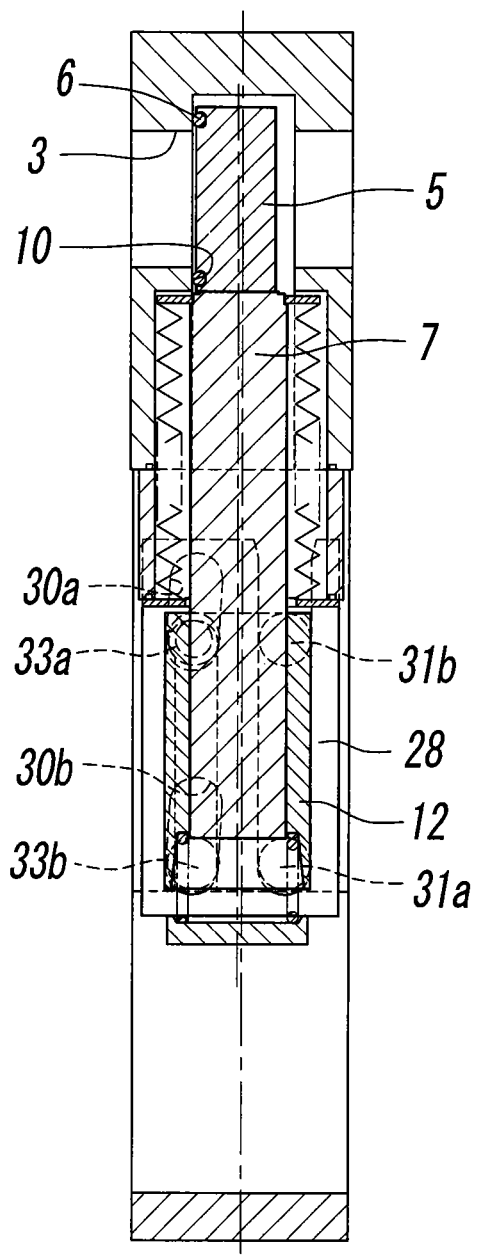
FIG. 7 is a vertical cross-sectional view of FIG. 6.

When the rod-side assembly and the shaft-side assembly reach the opposed position, the stop roller 36 comes into abutment with the abutting portion 37 at the upper end of the depression groove 38 as shown by a chain line in FIG. 8, so that the shaft-side assembly stops at that position. However, since the rod-side assembly compresses the compression spring 25 and further continues to move upward, the cam grooves 30a, 30b formed on the cam frame 28 move upward with respect to the cam rollers 33a, 33b. Therefore, the cam rollers 33a, 33b are pushed by groove walls of the inclined cam grooves 30a, 30b and are moved vertically with respect to the valve seat surface 10 in the direction toward the valve seat surface 10, and the shaft-side assembly moves with the cam rollers 33a, 33b in the same direction. Therefore, as illustrated in FIG. 6 and FIG. 7, the valve seal 6 of the valve plate 5 is pressed against the valve seat surface 10 and hence the opening 3 is closed, so that the valve plate 5 takes the closed position.

At this time, the movement of the rod-side assembly from the opposed position to the closed position is performed in parallel to the valve seat surface 10 by the cam frame 28 guided by the two guide rollers 31a, 31b, and a reaction force generated when the valve seal 6 is pressed against the valve seat surface 10 is received by the two guide rollers 31a, 31b through the cam frame 28.

Also, the stop roller 36 moves in the same direction as the first cam roller 33a along the flat surface 37a of the abutting portion 37 as shown by a solid line in FIG. 8, and is housed in the lateral groove portion 38a.

When the valve plate 5 takes the closed position, the cam rollers 33a, 33b do not necessarily move to the positions coming into abutment with lower ends of the cam grooves 30a, 30b, and may stop at positions before the lower ends of the cam grooves 30a, 30b according to a pressing force of the valve seal 6.

When opening the gate valve 1A, the lower port 8b of the air cylinder 8 is opened to the outside, and by supplying the compressed air to the upper port 8a, a reverse action from the case of closing the gate valve 1A is performed.

At this time, at the beginning, the compression spring 25 is gradually expanded simultaneously with the downward movement of the rod-side assembly in a state in which the stop roller 36 is in abutment with the abutting portion 37 by the spring force of the compression spring 25. Therefore, the cam frame 28 and the cam grooves 30a, 30b move downward, and the cam rollers 33a, 33b move vertically away from the valve seat surface 10, whereby the valve seal 6 moves vertically away from the valve seat surface 10 and the rod-side assembly moves to the opposed position illustrated in the right half of FIG. 1 and FIG. 5.

Then, subsequently, by the movement of the drive rod 9 further downward, the rod-side assembly and the shaft-side assembly move to the fully-open position integrally as illustrated to the left half of FIG. 1 and FIG. 4.

In this manner, according to the gate valve 1A, since the valve plate 5 is moved vertically with respect to the valve seat surface 10 and moves the valve seal 6 vertically toward and away from the valve seat surface 10, generation of abrasion powder is reliably prevented without causing friction between the valve seal 6 and the valve seat surface 10 or without allowing the valve seal 6 to rotate within the mounting groove.

In addition, since the opening and closing operation of the valve plate 5 with respect to the valve seat surface 10 in the vertical direction is realized by a direct advance movement of the air cylinder 8 by a simple change-direction mechanism using the cam grooves 30a, 30b and the cam rollers 33a, 33b interposed between the drive rod 9 and the valve shaft 7, the structure of the opening and closing operation is simple and less number of components is needed.

Figure 9:
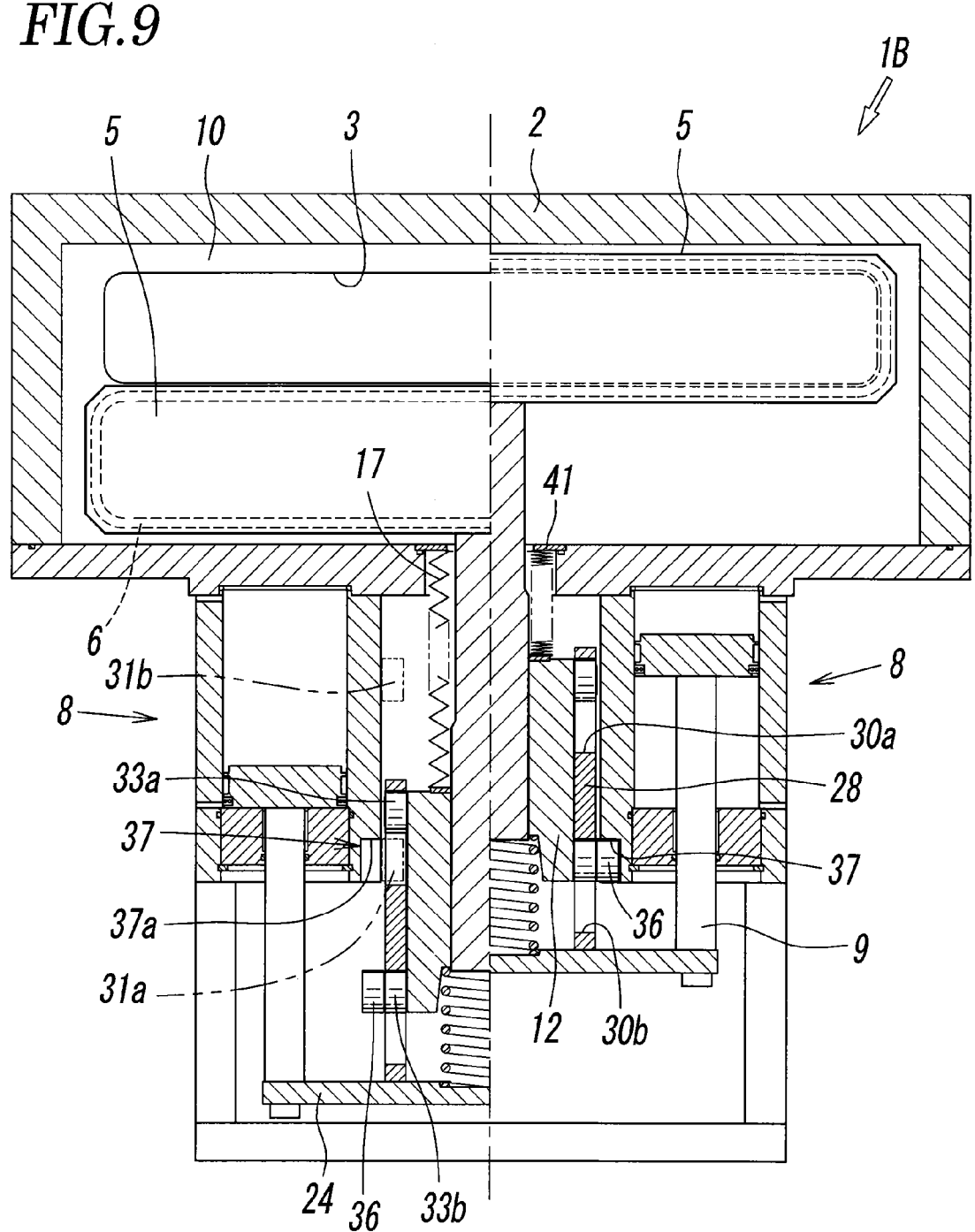
FIG. 9 is a cross-sectional view similar to FIG. 1 illustrating a second embodiment of a gate valve according to the present invention, and a left half indicates a state in which a valve plate is at a valve-open position, and a right half indicates a state in which the valve plate is at an opposed position.
Figure 10:
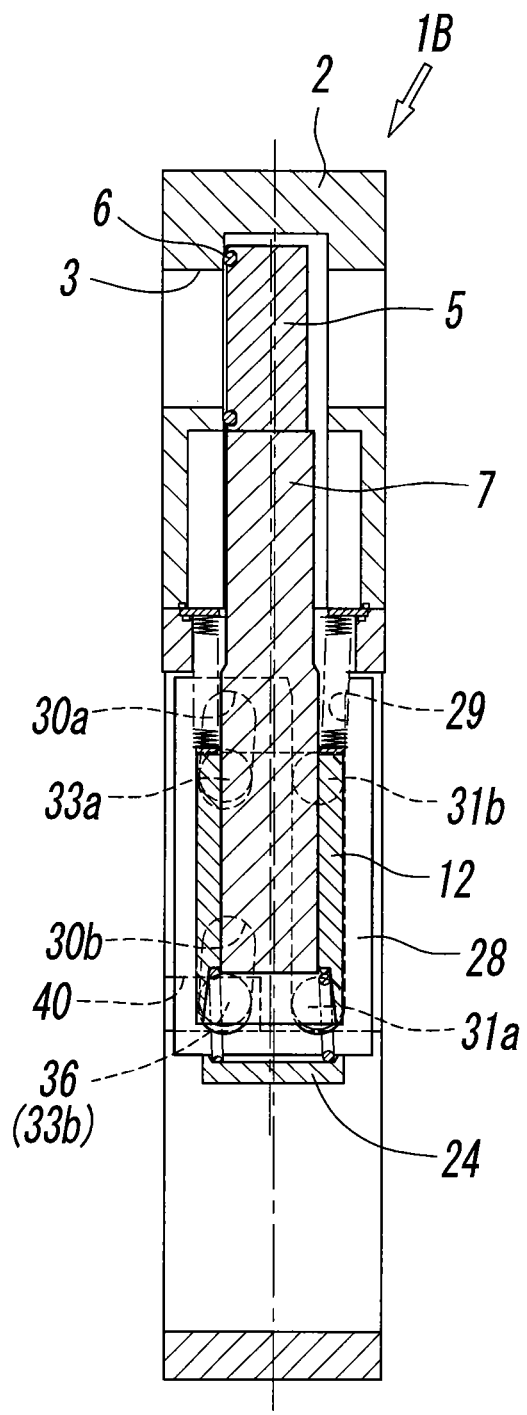
FIG. 10 is a vertical cross-sectional view illustrating a state in which the valve plate is moved to a closed position in FIG. 9.

FIG. 9 and FIG. 10 illustrate a second embodiment of the gate valve according to the present invention, and a gate valve 1B of the second embodiment is different from the gate valve 1A of the first embodiment in that the stop roller 36 from between the stop roller 36 and the abutting portion 37 which constitute the stopping mechanism is mounted coaxially with the lower second cam roller 33b, which is one of the upper and lower two cam rollers 33a, 33b mounted on the lever member 12 and the abutting portion 37 is formed of a depressing step portion 40 on a lower end of the roller frame 32, and the arrangement of the bellows 17 is different.

In other words, the depressing step portion 40 is formed by cutting part of the lower end portion of the inner side surface of the roller frame 32 into a recessed shape, and part of it corresponds to the abutting portion 37 and the flat surface 37a.

An upper end of the bellows 17 is coupled to an annular mounting member 41 fixed to an inner peripheral surface of the bonnet 11 in an air-tight manner, and a lower end of the bellows 17 is coupled to an upper end of the lever member 12 integrated with the valve shaft 7 in an air-tight manner.

Since the configurations and the operations of the second embodiment other than that described above are substantially the same as those in the first embodiment, principal and same components are designated by the same reference numerals as those in the first embodiment and description thereof is omitted.

FIG. 11 to FIG. 16 illustrate a third embodiment of the gate valve according to the present invention, and portions of a gate valve 1C of the third embodiment different from the gate valve 1A of the first embodiment are configurations of the guide groove 29 and the guide rollers 31a, 31b which constitute the parallel movement mechanism, the cam grooves 30a, 30b and the cam rollers 33a, 33b which constitute the vertical movement mechanism, and the stop roller 36 and the abutting portion 37 which constitute the stopping mechanism. Therefore, in the description given below, a configuration relating to a horizontal movement mechanism, the vertical movement mechanism, and the stopping mechanism will be described.

Figure 11:
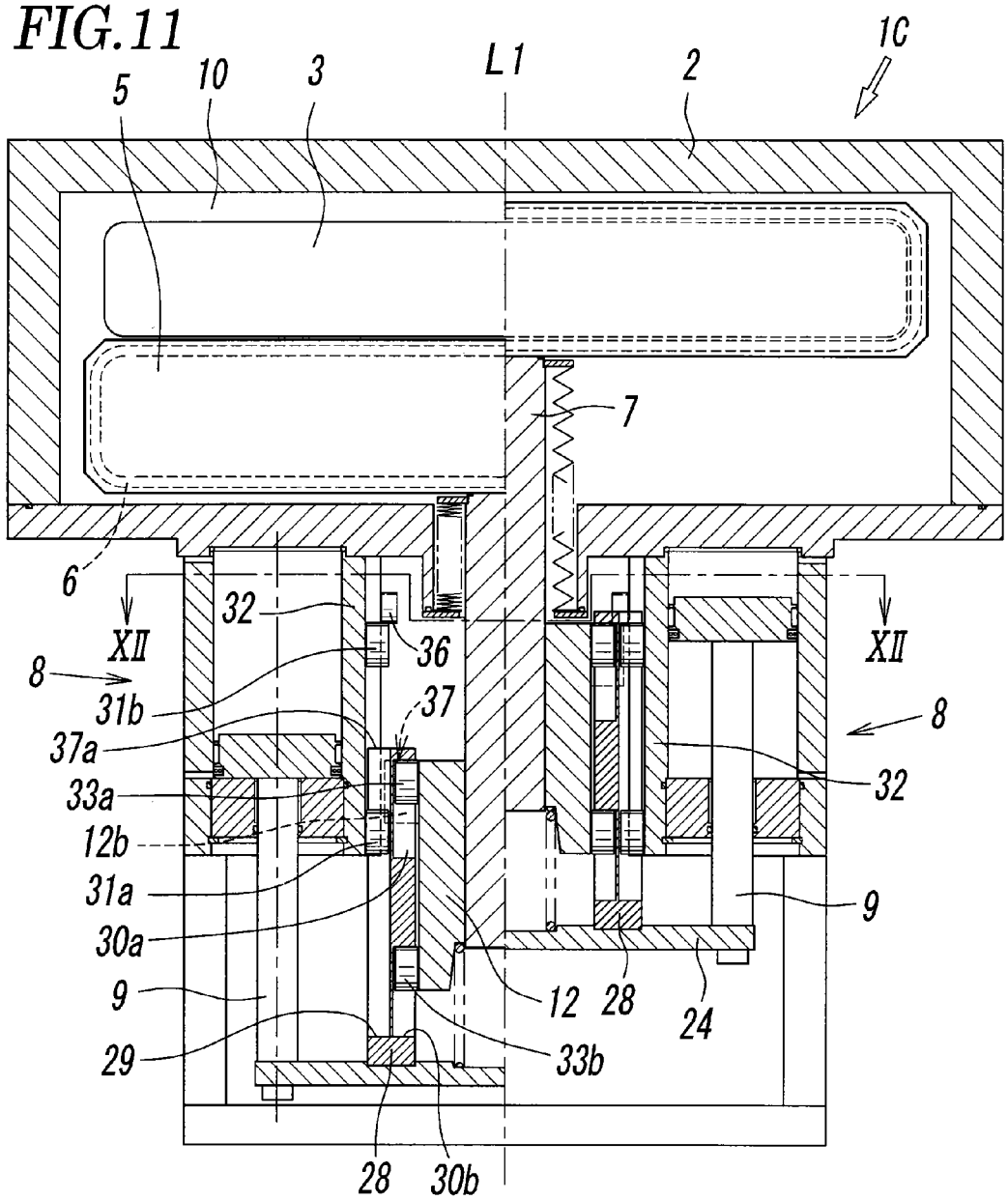
FIG. 11 is a cross-sectional view taken along the line XI-XI in FIG. 12 illustrating a third embodiment of a gate valve according to the present invention, and a left half indicates a state in which a valve plate is at a valve-open position, and a right half indicates a state in which the valve plate is at an opposed position.
Figure 12:
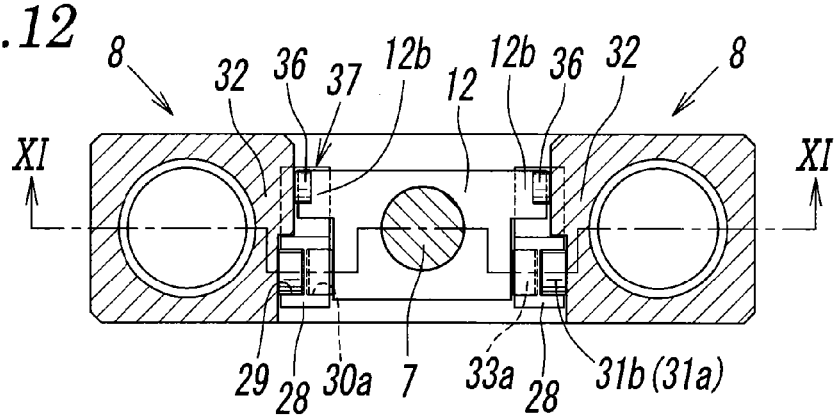
FIG. 12 is a cross-sectional view taken along the line XII-XII in FIG. 11.

As illustrated in FIG. 11 and FIG. 12, each of the pair of cam frames 28 fixed to the rod arm 24 is formed with the guide groove 29 and the cam grooves 30a, 30b at positions back to back on an outer side surface and an inner side surface. In other words, on the outer side surfaces of the cam frames 28 opposing the roller frames 32 are formed with one each of the guide groove 29 so as to extend in the vertical direction along the axial line L1 of the valve shaft 7, the two each of the inclined cam grooves 30a, 30b formed in two, upper and lower levels are formed on the inner surfaces of the cam frames 28 opposing the lever member 12. The depths of the cam grooves 30a, 30b and the guide grooves 29 are smaller than half the thickness of the cam frame 28. The positions of the guide grooves 29 and the cam grooves 30a, 30b may be shifted from each other in the width direction of the cam frame 28.

The two each of guide rollers 31a, 31b to be fitted to the guide grooves 29 are mounted on the inner side surfaces of the roller frames 32, and the two cam rollers 33a, 33b to be fitted individually to the two cam grooves 30a, 30b are mounted on outer side surfaces of the lever member 12.

The cam frames 28 are fixed so as to offset toward one side of the rod arm 24 in the width direction, and the guide rollers 31a, 31b and the cam rollers 33a, 33b are also mounted on positions offset toward one side of the roller frame 32 and the lever member 12 in the width direction corresponding to the cam frames 28.

The stop rollers 36 are mounted on the inner surfaces of the roller frames 32 at positions uncompetitive with the cam frames 28, and protruding portions 12b having the horizontal flat surfaces 37a as upper surfaces thereof are formed on both left and right surfaces of the lever member 12 at positions corresponding to the stop rollers 36, and the abutting portions 37 with which the stop rollers 36 come into abutment are formed by the protruding portions 12b.

Since the configurations other than that described above are substantially the same as those in the first embodiment, principal and same components are designated by the same reference numerals as those in the first embodiment and description thereof is omitted.

Figure 13:
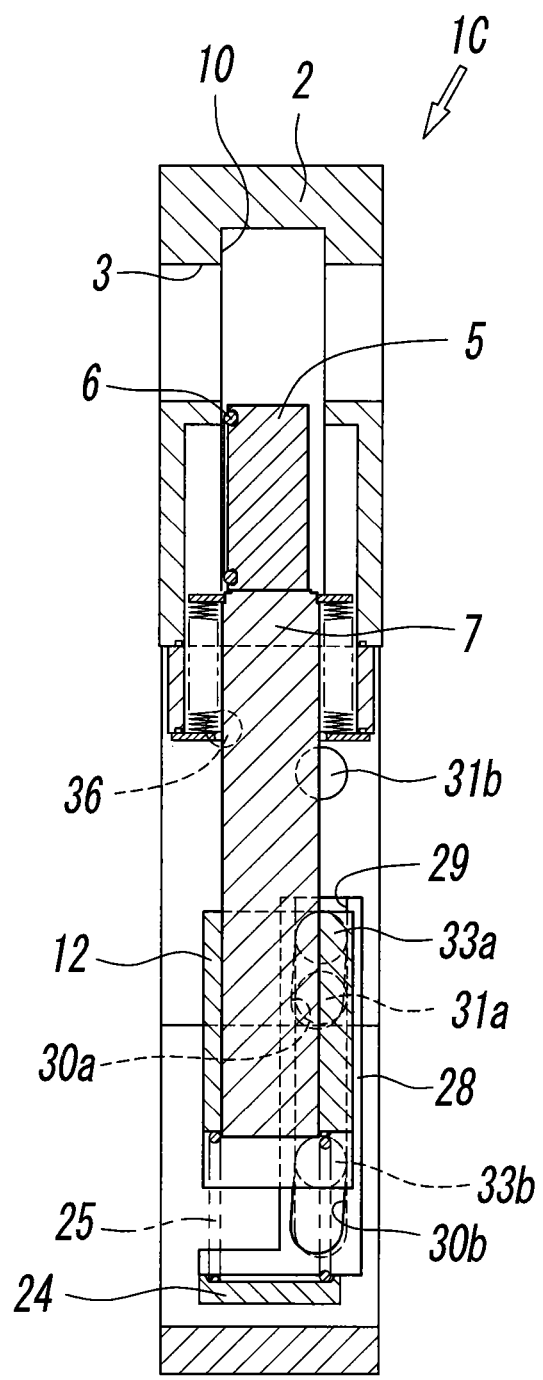
FIG. 13 is a vertical cross-sectional view of a left half side of FIG. 11.
Figure 14:
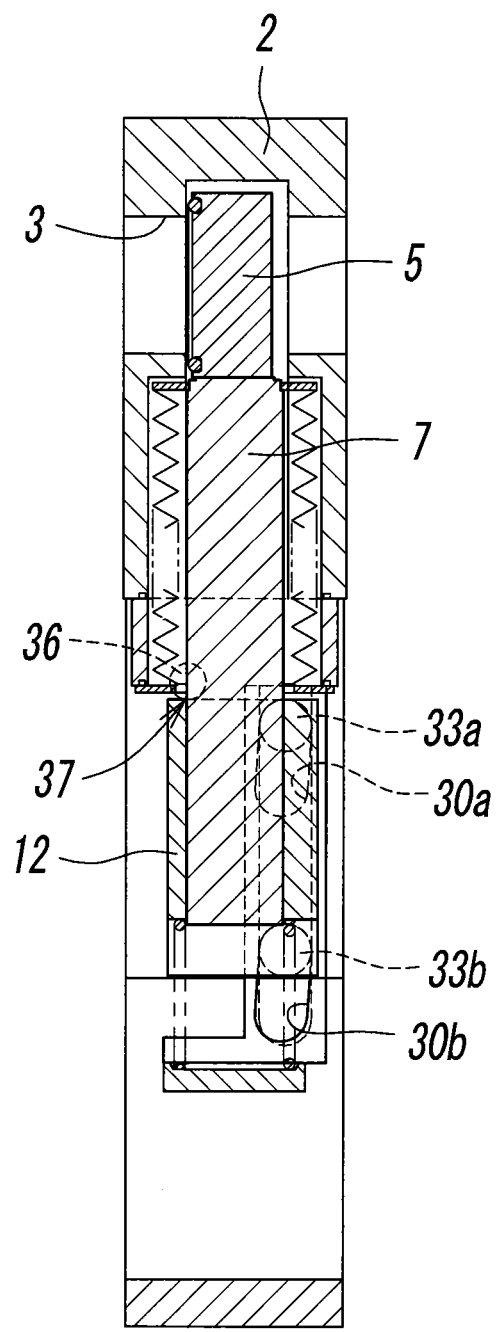
FIG. 14 is a vertical cross-sectional view of a right half side of FIG. 11.
Figure 15:
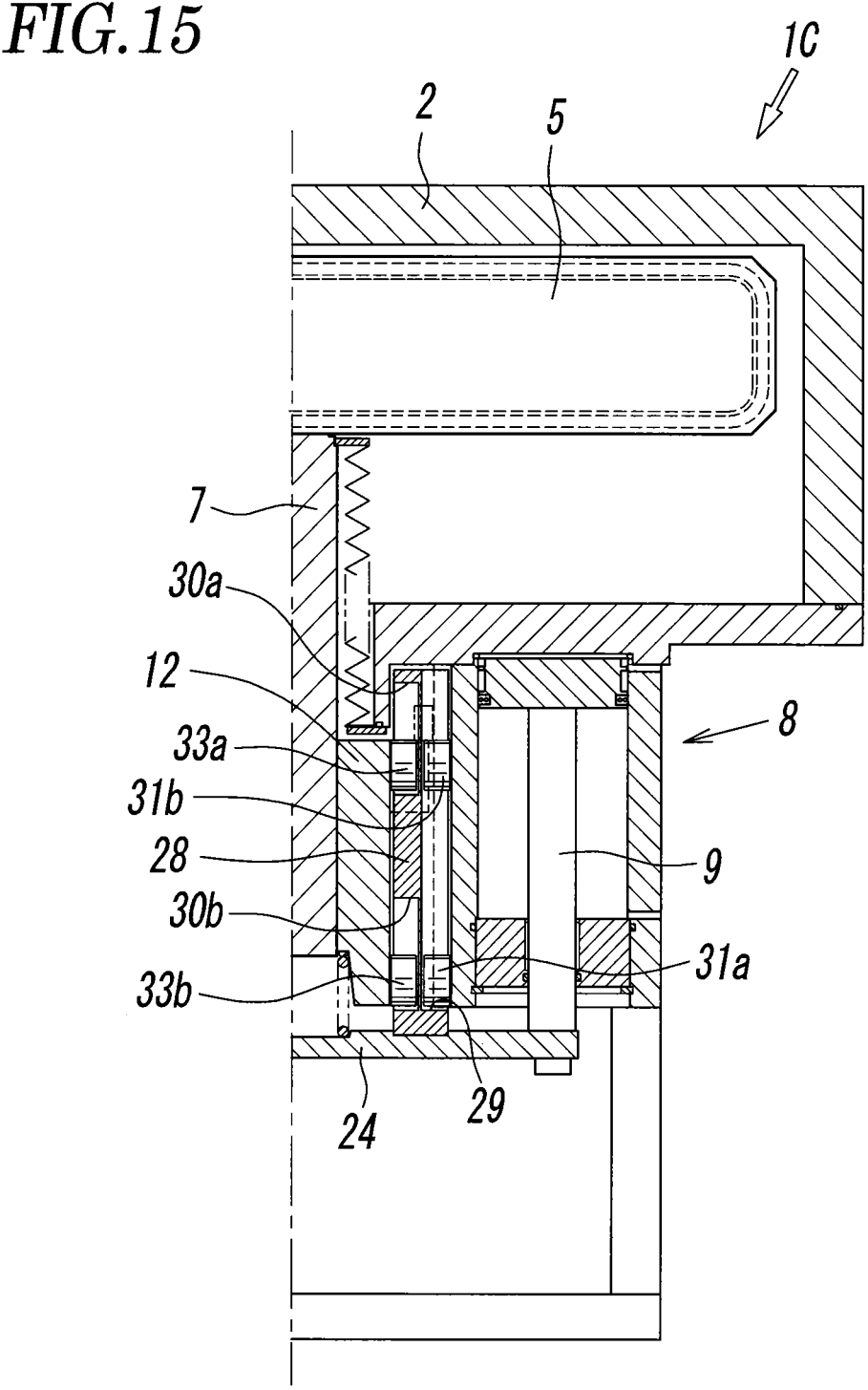
FIG. 15 is a cross-sectional view similar to the right half of the FIG. 11 illustrating in which the valve plate is in a closed position.
Figure 16:
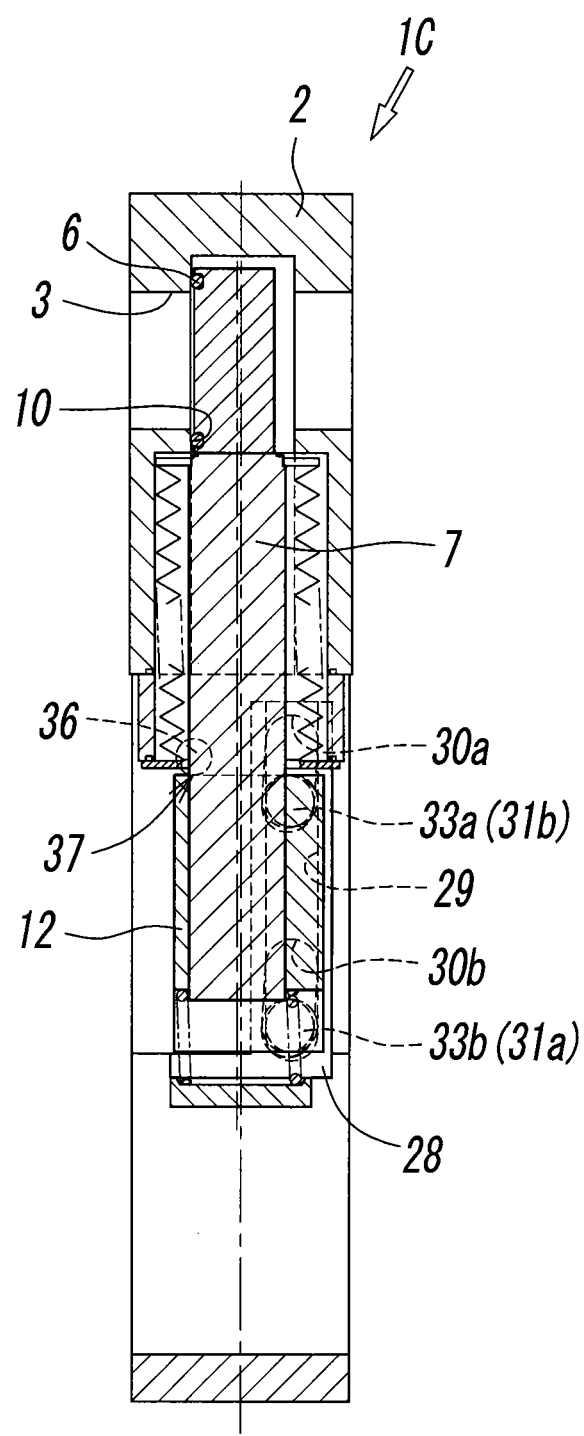
FIG. 16 is a vertical cross-sectional view of FIG. 15.

The valve-closing action of the gate valve 1C of the third embodiment is performed as same as the gate valve 1A of the first embodiment by proceeding from the state of the fully-opened position illustrated in the left half of FIG. 11 and FIG. 13 via the state of the opposed position illustrated in the right half of FIG. 11 and FIG. 14, to the state of the closed position illustrated in FIG. 15 and FIG. 16, and the valve opening action is performed by following the same route in a reverse order.

At this time, the parallel movement of the rod-side assembly and the shaft-side assembly with respect to the valve seat surface 10 is guided by the guide grooves 29 and the guide rollers 31a, 31b, and the vertical movement of the shaft-side assembly with respect to the valve seat surface 10 is guided by the cam grooves 30a, 30b and the cam rollers 33a, 33b. This point is also the same as the gate valve 1A of the first embodiment.

In contrast, as regards the stop rollers 36 and the abutting portions 37 which constitute the stopping mechanism, when the lever member 12 fixed to the valve shaft 7 is moved upward from the fully-opened position to the opposed position, the upper surfaces of the abutting portions 37 formed on the lever member 12 come into abutment with the stop rollers 36 mounted on the roller frames 32, and the lever member 12 is stopped at that position. Then, when the valve shaft 7 is moved toward the closed position by the action of the vertical movement mechanism, the lever member 12 moves toward the closed position relatively with respect to the stop roller 36.

Figure 17:
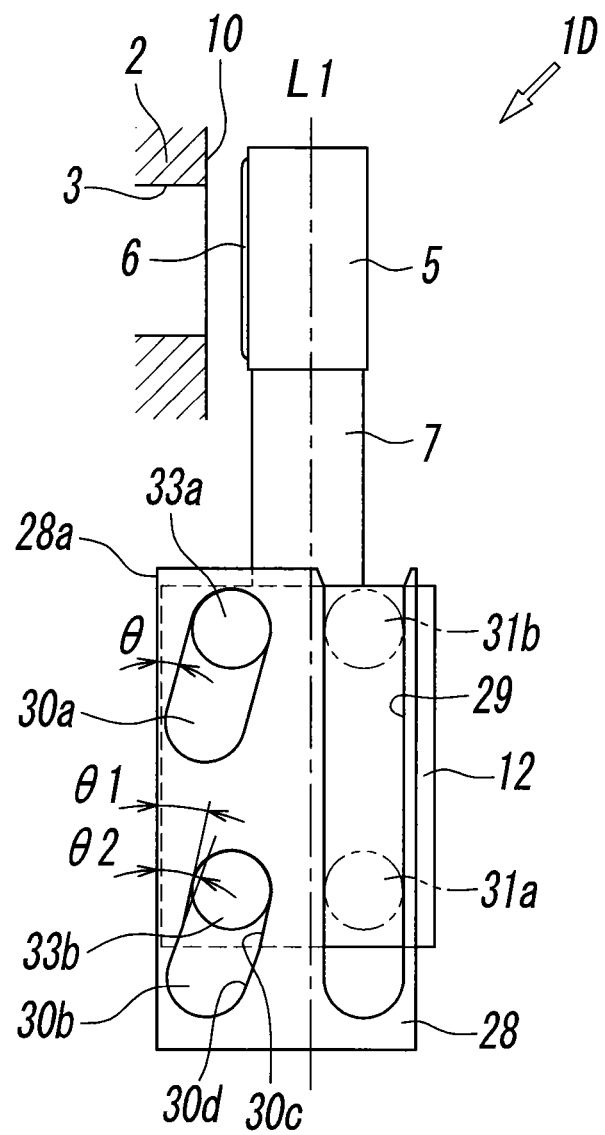
FIG. 17 is a side view illustrating a principal portion of a fourth embodiment of a gate valve according to the present invention in a simplified manner, and illustrating a state in which a valve plate is at an opposed position.
Figure 18:
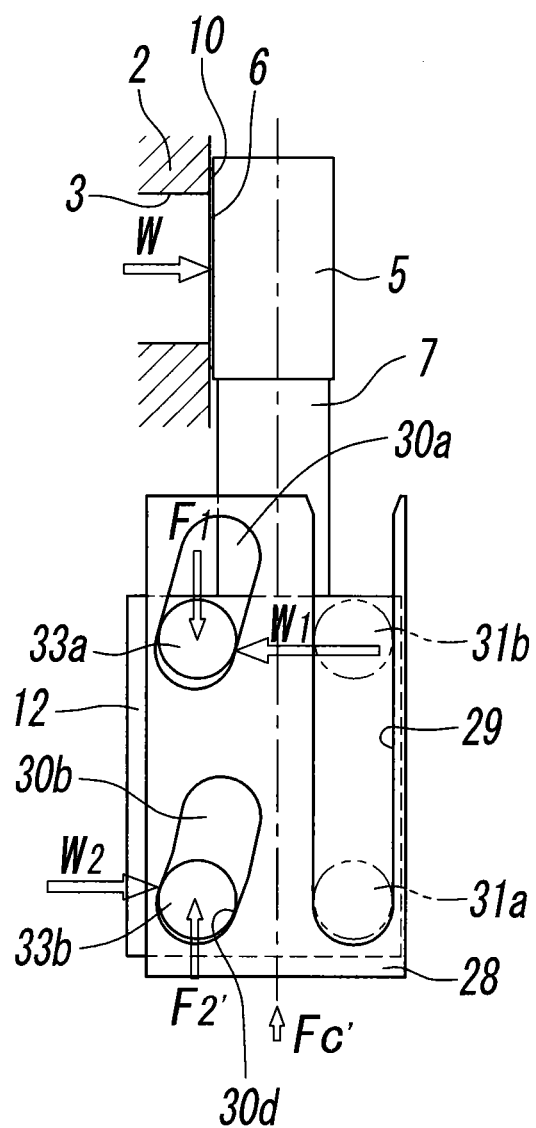
FIG. 18 is a side view illustrating a state in which the valve plate is moved from the position in FIG. 17 to a closed position.

FIG. 17 and FIG. 18 are side views illustrating principal portions of a gate valve 1D according to a fourth embodiment in a simplified manner. A different point of the gate valve 1D of the fourth embodiments from the gate valves 1A to 1C of the first to the third embodiment is the shapes of the cam grooves 30a, 30b, in particular, the shape of the second cam groove 30b, and a required thrust of an air cylinder (not illustrated) which opens and close the valve plate 5 is reduced by differentiating the shape of the second cam groove 30b from the shape of the second cam groove 30b of the gate valves 1A to 1C according to the first to the third embodiments. The configurations of the gate valve 1D of the fourth embodiment different from the gate valves 1A to 1C of the first to the third embodiments will be described below.

As illustrated in FIG. 17, the cam frame 28 is formed with two of the cam grooves 30a, 30b arranged in two steps in the direction of the axial line L1 of the valve shaft 7, and two of the cam rollers 33a, 33b mounted on the lever member 12 are individually fitted to the cam grooves 30a, 30b.

One of the two cam grooves 30a, 30b closer to the valve plate 5, that is, the first cam groove 30a is a linear groove having a constant groove width and an angle of inclination of the first cam groove 30a with respect to the axial line L1 is θ. In the illustrated embodiment, since a side surface 28a of the cam frame 28 is parallel to the axial line L1 of the valve shaft 7, the angle of inclination of a groove wall with respect to the side surface 28a is expressed as the angle of inclination θ of the first cam groove 30a. This also applies to the second cam groove 30b described below.

In contrast, the second cam groove 30b farther from the valve plate 5 has a first groove portion 30c and a second groove portion 30d having the same groove width and different angle of inclination from each other, and an angle of inclination θ1 of the first groove portion 30c located on the nearer side to the valve plate 5 is smaller than the angle of inclination θ of the first cam groove 30a and an angle of inclination θ2 of the second groove portion 30d located on the farther side from the valve plate 5 is larger than the angle of inclination θ of the first cam groove 30a. However, the angle of inclination θ1 of the first groove portion 30c may be equal to the angle of inclination θ of the first cam groove 30a.

The configurations other than those described above of the gate valve 1D of the fourth embodiment are substantially the same as any one of the gate valves 1A to 1C of the first to the third embodiments. Therefore, portions other than those described above illustrated in FIG. 17 and FIG. 18 are designated by the same reference numerals as the gate valves 1A to 1C of the first to the third embodiments, and the operation of the gate valve 1D will be described below.

FIG. 17 illustrates a state in which the valve plate 5 is at the opposed position in which the valve plate 5 faces the opening 3 of the valve box 2, but does not close the opening 3. At this time, the valve plate 5, the valve shaft 7, and the lever member 12 in the integral relationship with each other are in a state in which further upward movement is inhibited, and the first cam roller 33a, which is one of the two cam rollers 33a, 33b, is located on an upper end portion of the first cam groove 30a, and the second cam roller 33b is located on an upper end portion of the first groove portion 30c of the second cam groove 30b, and the two guide rollers 31a, 31b mounted on a roller frame (not illustrated) are fitted into the guide groove 29 formed on the cam frame 28.

In the state in FIG. 17, when the cam frame 28 driven by the air cylinder is guided by the guide rollers 31a, 31b fitted to the guide groove 29, and is moved in the direction of the axial line L1, the cam rollers 33a, 33b are pushed by the inclined cam grooves 30a, 30b and are moved leftward in the drawing as illustrated in FIG. 18. Therefore, the lever member 12, the valve shaft 7, and the valve plate 5 are integrated and are moved toward the valve seat surface 10 vertically with respect to the valve seat surface 10, and the valve seal 6 is bought into press contact with the valve seat surface 10, and hence the opening 3 is closed, so that the valve plate 5 takes the closed position. At this time, the second cam roller 33b is located in the second groove portion 30d of the second cam groove 30b.

Subsequently, a thrust of the air cylinder acting on the cam frame 28 when the opening 3 is closed by the valve plate 5 will be described below while comparing the case of the gate valves 1A to 1C of the first to the third embodiments and the case of the gate valve 1D of the fourth embodiment.

Figure 19:
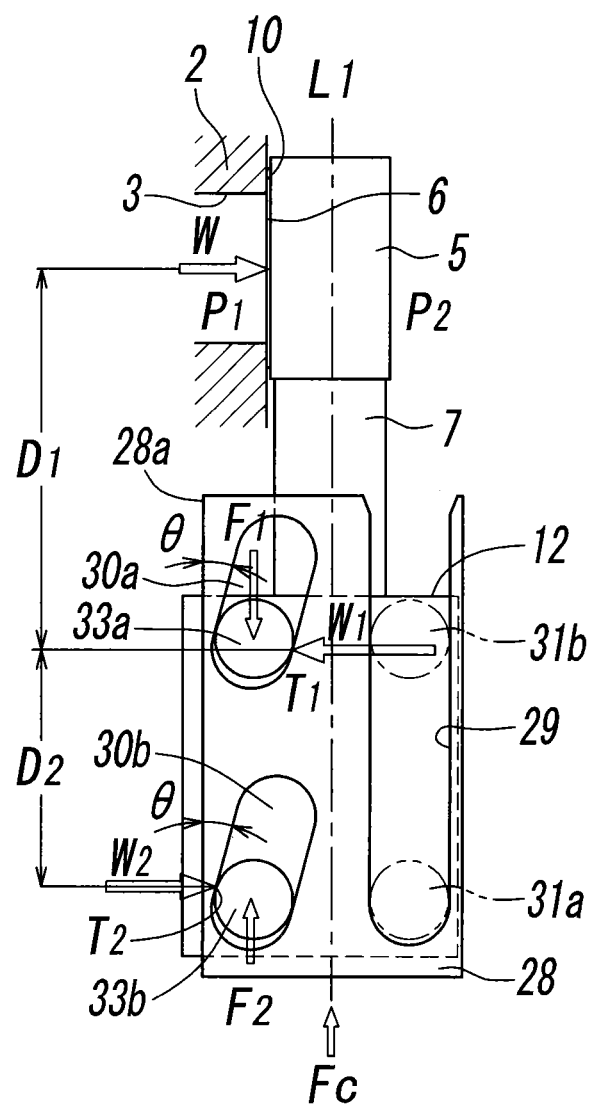
FIG. 19 is a side view of the gate valve according to the first to the third embodiments illustrating a state in which the valve plate is at the opposed position for comparison with FIG. 18.

FIG. 19 is a side view of a principal portion of a case where the valve plate 5 is at the closed position where the opening 3 is closed in the gate valves 1A to 1C of the first to third embodiments. At this time, the opening 3 side has atmospheric pressure P1, and a back side of the valve plate 5 has a vacuum pressure P2.

In the same drawing, where W is a pressure contact force of the valve seal 6 with respect to the valve seat surface 10, D1 is a distance from the center of the valve seat surface 10 to an action point T1 where a force of the first cam groove 30a acts on the first cam roller 33a, and D2 is a distance from the action point T1 to an action point T2 where a force of the second cam groove 30b acts on the second cam roller 33b, a load W2 applied to the action point T2 is W2=W(D1/D2), and a load W1 applied to the action point T1 is W1=W+W2 in a direction opposite from the W2.

Since the cam frame 28 pushed by a thrust Fc of the air cylinder receives the load W1 at the action point T1 of the first cam groove 30a, a small gap is formed between the groove wall on the opposite side of the action point T1 and the first cam roller 33a. Therefore, a force F1 in the direction parallel to the valve seat surface 10 by the first cam groove 30a becomes F1=(−W1)·(tan θ), and is a reaction force with respect to the thrust Fc.

In contrast, the action point T2 of the second cam groove 30b is on the groove wall side opposite from the action point T1 of the first cam groove 30a, and a force F2 which is parallel to the valve seat surface 10 by the second cam groove 30b becomes F2=(+W2)·(tan θ), and acts on the same direction as the thrust Fc. Therefore, the required thrust Fc of the air cylinder becomes Fc=F1−F2.

In contrast, in the case of the gate valve 1D of the fourth embodiment, the second cam roller 33b is located within the second groove portion 30d of the second cam groove 30b as illustrated in FIG. 18, and hence a force F2' in the direction parallel to the valve seat surface 10 by the second cam groove 30b becomes F2'=(+W2)·(tan θ2). Here, since θ2>0, even when the relationship among W, W1, W2, D1 and D2 described above is the same as the case in FIG. 19, the force F2' is larger than F2 in FIG. 19, and hence the value of the required thrust of the air cylinder Fc'=F1−F2' becomes smaller than the value of Fc in FIG. 19.

Consequently, a compact air cylinder having a smaller thrust than the case of the first to third embodiments may be used as the air cylinder described above.

When the valve plate 5 is moved to the closed position and the back side of the valve plate 5 becomes the vacuum pressure P2 and the opening 3 side becomes the atmospheric pressure P1, there is a case where the loads W1, W2 applied to the action points T1, T2 are increased by the increase in the press contact force W of the valve seal 6 and hence the cam frame 28 is moved slightly downward and the amount of compression of the valve seal 6 is decreased. However, since the difference between the forces F1 and F2', that is, F1−F2' that acts on the reverse direction is small, the amount of downward movement of the cam frame 28 is reduced to an ignorable extent, and hence the reduction in the amount of compression of the valve seal 6 is significantly decreased, whereby leak may further be inhibited.

In the respective embodiments, although two of the air cylinders 8 are provided for opening and closing the valve plate 5, it is also possible to provide only one air cylinder, and couple the rod arm 24 to the drive rod of the air cylinder.

In the respective embodiments, although two of the guide rollers 31a, 31b are mounted on the left and right roller frames 32 respectively, it is also possible to configure all the guide rollers are fitted to the guide groove 29 by mounting three or more guide rollers on the respective roller frames 32, causing at least one guide roller except for some guide rollers to fit the guide groove 29 of the cam frame 28 at the position where the valve plate 5 is fully opened, and causing remaining guide rollers to fit the guide groove 29 at positions where the valve plate 5 is at the opposing position and the closed position.

It is also possible to apply the arrangement of the bellows 17 in the gate valve of the first embodiment to the gate valve of the second embodiment, and in contrast, to apply the arrangement of the bellows 17 in the gate valve of the second embodiment to the gate valves of the first and third embodiments.

Furthermore, when the gate valve is not used in a vacuum state, the bellows may be omitted.

REFERENCE SIGNS LIST 1A, 1B, 1C, and 1D gate valve
2 valve box
3 opening
5 valve plate
6 valve seal
7 valve shaft
8 air cylinder
9 drive rod
10 valve seat surface
12 lever member
24 rod arm
25 compression spring
28 cam frame
29 guide groove
30a 30b cam groove
30c first groove portion
30d second groove portion
31a, 31b guide roller
32 roller frame
33a, 33b cam roller
L1 axial line of valve shaft
θ, θ1, θ2 angle of inclination

The invention claimed is:

1. A non-sliding gate valve including: a valve plate stored in a valve box having an opening; a valve seal mounted on the valve plate; a valve shaft coupled to the valve plate; an air cylinder having a drive rod coupled to the valve shaft, the gate valve being configured to move from a fully-open position where the valve plate does not oppose the opening through an opposed position where the valve plate opposes the opening to a closed position where the valve plate closes the opening by pressing the valve seal to a valve seat surface around the opening by moving the valve shaft by the air cylinder, comprising:
a coupling mechanism configured to couple the drive rod and the valve shaft so as to be displaceable with respect to each other; a parallel movement mechanism configured to move the valve plate and the valve shaft from the fully-open position to the opposed position in parallel to the valve seat surface; and a vertical movement mechanism configured to move the valve plate and the valve shaft from the opposed position to the closed position vertically with respect to the valve seat surface,
wherein the coupling mechanism includes:
a rod arm fixed to the drive rod;
a lever member fixed to the valve shaft; and
a compression spring interposed between the lever member and the rod arm,
wherein the parallel movement mechanism includes:
a pair of left and right cam frames fixed to the rod arm so as to face a left side surface and a right side surface of the lever member respectively;
guide grooves formed so as to be parallel to the valve seat surface on the cam frames respectively; and
guide rollers mounted on a pair of left and right roller frames fixed to a bonnet on which the valve box is mounted and configured to fit the guide grooves,
wherein the vertical movement mechanism includes:
cam grooves formed respectively on the pair of cam frames in the direction inclined with respect to the valve seat surface; and
cam rollers mounted respectively on the left side surface and the right side surface of the lever member and configured to fit the cam grooves.

2. The gate valve according to claim 1, wherein one of the guide groove and the two of the cam grooves are formed on each of the pair of cam frames, and the two cam rollers are mounted on the left side surface and the right side surface of the lever member respectively.

3. The gate valve according to claim 2, wherein the guide grooves are formed so as to be parallel to an axial line of the valve shaft, and the two cam grooves and the two cam rollers fitting to the cam grooves are disposed in two steps in the direction of axial line of the valve shaft.

4. The gate valve according to claim 3, wherein the guide grooves are formed on one half side of the cam frames in the width direction, and the cam grooves are formed on the other half side of the cam frame in the width direction.

5. The gate valve according to claim 3, wherein the guide grooves are formed on outer surfaces of the cam frames opposing the roller frame, and the cam grooves are formed on inner surfaces of the cam frames opposing the lever member.

6. The gate valve according to claim 3, wherein the cam grooves disposed in two steps include the first cam groove arranged at the position closer to the valve plate and the second cam groove arranged at the position farther from the valve plate, the second cam groove includes a first groove portion and a second groove portion whose angles of inclination with respect to the direction of the axial line of the valve shaft are different from each other, the second groove portion is arranged at a position farther from the valve plate than the first groove portion, and an angle of inclination of the second groove portion is larger than an angle of inclination of the first cam groove with respect to the direction of the axial line of the valve shaft.

7. The gate valve according to claim 3, wherein one each of the air cylinders are provided on the left side and the right side of the valve shaft in a state of being fixed to the bonnet, the rod arm is mounted on the two drive rods extending from the two air cylinders, and cylinder housings serve as the roller frames.

8. The gate valve according to claim 3, wherein the guide grooves are grooves opened on one end of each thereof, a plurality of the guide rollers are mounted on the left and right roller frames respectively, at least one guide roller from among the plurality of guide rollers is fitted to the guide grooves when the valve plate is at the fully-open position, and all the guide rollers fit to the guide grooves when the valve plate is at the opposed position and the closed position.

9. The gate valve according to claim 3, wherein the cam grooves disposed in two steps include the first cam groove arranged at a position closer to the valve plate and the second cam groove arranged at a position farther from the valve plate, and angles of inclination of the first cam groove and the second cam groove with respect to the direction of axial line of the valve shaft is equal to each other.

10. The gate valve according to claim 2, wherein the guide grooves are grooves opened on one end of each thereof, a plurality of the guide rollers are mounted on the left and right roller frames respectively, at least one guide roller from among the plurality of guide rollers is fitted to the guide grooves when the valve plate is at the fully-open position, and all the guide rollers fit to the guide grooves when the valve plate is at the opposed position and the closed position.

11. The gate valve according to claim 2, wherein one each of the air cylinders are provided on the left side and the right side of the valve shaft in a state of being fixed to the bonnet, the rod arm is mounted on the two drive rods extending from the two air cylinders, and cylinder housings serve as the roller frames.

12. The gate valve according to claim 1, wherein the guide grooves are grooves opened on one end of each thereof, a plurality of the guide rollers are mounted on the left and right roller frames respectively, at least one guide roller from among the plurality of guide rollers is fitted to the guide grooves when the valve plate is at the fully-open position, and all the guide rollers fit to the guide grooves when the valve plate is at the opposed position and the closed position.

13. The gate valve according to claim 1, wherein one each of the air cylinders are provided on the left side and the right side of the valve shaft in a state of being fixed to the bonnet, the rod arm is mounted on the two drive rods extending from the two air cylinders, and cylinder housings serve as the roller frames.

\* \* \* \* \*